United States Patent [19]

Pernemalm et al.

[11] Patent Number: 4,665,164
[45] Date of Patent: May 12, 1987

[54] POLYSACCHARIDE CROSSLINKED SEPARATION MATERIAL AND ITS PREPARATION

[75] Inventors: Per-Åke Pernemalm; Mats Carlsson; Göran Lindgren, all of Uppsala, Sweden

[73] Assignee: Phamarcia Aktiebolag, Uppsala, Sweden

[21] Appl. No.: 629,476

[22] Filed: Jul. 10, 1984

[30] Foreign Application Priority Data

Jul. 19, 1983 [SE] Sweden ............................ 8304041

[51] Int. Cl.$^4$ .................... C07H 1/00; C07H 3/00; C08B 37/00
[52] U.S. Cl. ................................ 536/120; 536/114; 536/124
[58] Field of Search .................. 536/120, 114, 124

[56] References Cited

U.S. PATENT DOCUMENTS

| | | | |
|---|---|---|---|
| 3,275,576 | 9/1966 | Flodin et al. | 536/120 |
| 3,324,108 | 6/1967 | Moller et al. | 536/120 |
| 3,402,169 | 9/1968 | Jackson | 536/120 |
| 4,011,389 | 3/1977 | Langdon | 536/120 |
| 4,076,930 | 2/1978 | Ellingboe et al. | 536/120 |
| 4,098,615 | 7/1978 | Cummisford et al. | 536/114 |
| 4,549,907 | 10/1985 | Kohn | 536/114 |

OTHER PUBLICATIONS

Gribnau et al, "Analytical Chemistry Symposia Series", vol. 9, 1982, pp. 114–129.

*Primary Examiner*—Johnnie R. Brown
*Attorney, Agent, or Firm*—Fred Philpitt

[57] ABSTRACT

A separation material of crosslinked agarose in which the agarose is crosslinked using at least one bi- or polyfunctional crosslinking agent, which gives a chain of 6 to 12 atoms between two binding points, on one hand and using at least one bifunctional crosslinking agent, which gives a chain of 2 to 5 atoms between two binding points on the other.

The separation material is prepared by crosslinking agarose in two steps with (a) a bi- or polyfunctional crosslinking agent, which gives a chain of 6 to 12 atoms between two binding points and (b) a bifunctional crosslinking agent, which gives a chain of 2 to 5 atoms between two binding points, preferably in the order mentioned.

6 Claims, No Drawings

POLYSACCHARIDE CROSSLINKED SEPARATION MATERIAL AND ITS PREPARATION

The present invention relates to a separation material of cross-linked agarose and to a process for the preparation of said separation material.

Agar and agarose gels which are built up of polysaccharide molecules have got an extensive application in chromatographic separations, e.g. such processes which are based on diffusion of dissolved substances, i.a. because of the ability of such gels to bind great amounts of water. In these separations a mixture of substances of different molecular sizes is passed through a bed of gel particles which are soaked with an aqueous solution. Molecules having different sizes will then pass the gel bed at different rates. (This type of separation is generally designated gel filtration.) The separation properties of the gel is depending on the size of the pores and the possible presence of groups which cause adsorption of molecules to the gel. For that reason, in gel filtration it is important that the gel exhibits very few such groups, for instance charged groups. In order to make fast separations possible, the solution containing the substances to be separated is pumped through the gel bed. In this connection a reduction in the particle size is necessary in order to carry out the separation with retained resolution. When the solution is pumped through the gel bed a counterpressure arises which is dependent on the size of the gel particles. When using smaller particles a higher pressure is required which necessitates a higher degree of rigidity of these particles if they should not collapse resulting in impaired flow properties and, at the worst, discontinuation of the flow.

The ideal gel for separations of biological substances by means of gel filtration should be hydrophilic, macroporous, chemically resistant, mechanically stable and should not contain charged groups or other adsorption centres.

Such a gel will also be ideal for the preparation of base matrices for products such as ion-exchangers and affinity materials.

Agar and agarose products for chromatographic and electrophoretic separations are commercially available and the starting material thereof has been modified in different ways to meet the demands raised above. In order to make the gels more stable from both chemical and mechanical point of view the gels are cross-linked, in which case a molecular chain, Z, is introduced between two hydroxyl functions (the oxygen atoms of which become binding points for the chain Z) of the starting polymer and the following binding arises:

—O—Z—O—.

When a great number of cross-links of this type is introduced in the gel the structure thereof is stabilized. Thus, for instance, crosslinking with epichlorohydrin is described in U.S. Pat. specification No. 3,507,851 and crosslinking with bifunctional reactants containing the functional groups —COCl, —SO$_2$Cl and —N=C=S in U.S. Pat. specification No. 3,860,573. British patent specification No. 1,352,613 describes crosslinking with epihalohydrin, bis-epoxides, divinyl sulphone and other crosslinking vinyl compounds under non-oxidizing conditions in order to attain a reduced content of charged groups.

It has become evident, however, that among the criteria of an ideal gel the available products are not able to comply with the demand for a sufficient mechanical stability to be useful in separations by means of small gel particles, when high pressures arise in the gel bed. This technique, so-called HPLC ("High Performance Liquid Chromatography") has gained increased importance since the demands for rapid separations are increasing. Modifying of agarose gels in the way known from literature has accordingly not been a sufficient measure to achieve the desired rigidity. Porath J. et al. (Journal of Chromatography 103 (1975) 49–62) have in particular studied the influence of crosslinking agents with different chain lengths on the properties of the agarose gels and it was established that a gel of considerably improved rigidity was obtained with crosslinking agents wherein the inserted molecular chain Z has a length of 5 atoms. These results were interpreted so that the chain length in question fits into the structure of the agarose gels without exerting any influence on the size of the pores.

It has now surprisingly been found that a gel having greatly improved flow properties can be obtained by accomplishing the crosslinking reaction in a new way.

According to the present invention the crosslinking is carried out in a two step process. In one reaction step at least one bi- or polyfunctional crosslinking agent is used which agent gives a chain length of 6 to 12 atoms between two binding points (cf. Z above). As should be apparent, this is a considerably longer chain than the one which according to Porath et al. was found to give an optimum result. In another reaction step the polymer is reacted with at least one crosslinking agent which gives a chain length of 2 to 5 atoms. It appeared that the combination of these two steps using crosslinking agents having different chain lengths gives a product with vastly superior properties. It appeared particularly to advantage to carry out the first reaction with the longer crosslinking agent (chain length of 6 to 12 atoms), preferably in an aprotic solvent, and then further stabilizing the product thus obtained by means of a shorter crosslinking agent (chain length of 2 to 5 atoms) in a second step.

In accordance with that the invention is related to a separation material of crosslinked agarose which separation material is characterized in that the agarose is crosslinked using at least one bi- or polyfunctional crosslinking agent, which gives a chain of 6 to 12 atoms between two binding points, on one hand and using at least one bifunctional crosslinking agent, which gives a chain of 2 to 5 atoms between two binding points, on the other.

The process according to the invention is characterized in that agarose is crosslinked in two steps with (a) at least one bi- or polyfunctional crosslinking agent, which gives a chain of 6 to 12 atoms between two binding points, and (b) at least one bifunctional crosslinking agent, which gives a chain of 2 to 5 atoms between two binding points, preferably in the order mentioned.

Preferably, aliphatic epoxides or their corresponding halohydrins or epihalohydrins or halides are used as crosslinking agents since these compounds form ether bonds to hydroxyl group-containing matrices. Bonds of that type are chemically stable under the conditions prevailing at chromatographic separations and no charged groups are introduced at the reaction which could give rise to undesired adsorption effects.

In the first reaction step there is preferably used a crosslinking agent which does not contain halogenide in order to avoid neutralizing with hydroxide. The longer crosslinking agent which advantageously is applied in the first reaction step usually consists of an epoxide for that reason.

As examples of bifunctional crosslinking agents for this first step with a longer crosslinking agent compounds of the formula

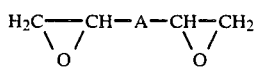

can be mentioned, wherein A is a straight or single-branched alkylene group which possibly is broken by an aromatic group and/or by one or more oxygen atoms and which possibly is substituted with one or more hydroxyl groups, at most one oxygen atom being bound to one and the same carbon atom of the bifunctional crosslinking agent and A having a chain length of 2 to 8 atoms. The aromatic group is preferably a phenyl group.

Examples of trifunctional crosslinking agents to be used in the process according to the invention are the compounds having the formulae

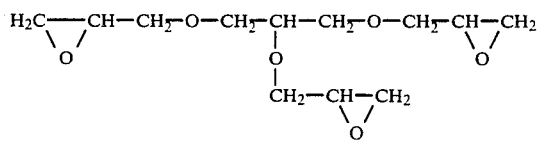

and

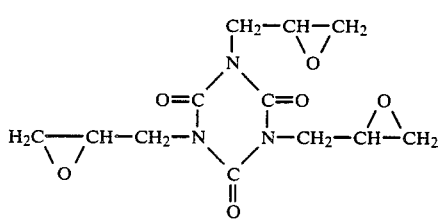

As a tetrafunctional crosslinking agent, for instance, the compound having the formula

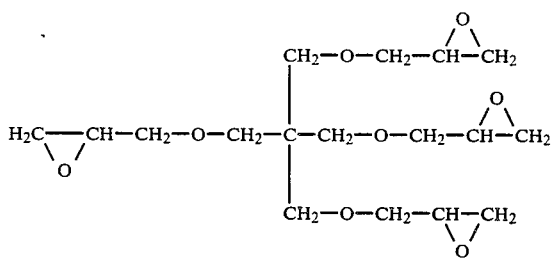

can be used.

In place of the above epoxides the corresponding halohydrins, epihalohydrins or halides can be used.

As examples of the shorter crosslinking agent compounds of the formula

can be mentioned, wherein Hal is chlorine or bromine, or the corresponding epoxy compounds of the formula

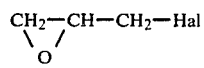

which can be obtained from the dihalohydrin above by splitting of hydrogen halide, or the compound diepoxybutane which has the formula

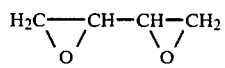

The reaction in the first crosslinking step is carried out in an aprotic solvent in order to reduce side reactions and to increase the stability of the starting material, the agarose gel. A possible side effect when using aprotic solvents, however, is that the content of hydroxyl groups of the gel decreases and that the gel thereby is given a corresponding hydrophobic element. In order to counteract this the last crosslinking step is therefore preferably divided up into two partial steps, the first partial step of which is carried out in an aprotic solvent and the second one in aqueous solution. Possibly, the last crosslinking step is carried out entirely in an aqueous solution.

In the first as well as in the second crosslinking step there may be used in the respective step one single crosslinking agent or a mixture of two or more different crosslinking agents. Preferably, in this connection, crosslinking agents within the same group of chain lengths are used within the different steps. It is fully conceivable, however, to use mixtures of crosslinking agents from both groups of chain lengths, in which case, for instance, the quantity ratio between the components belonging to the different groups of chain lengths can be varied between the two steps from a predominant share of components from the one group in the first step to a predominant share of components from the other group in the second step.

Furthermore, when epichlorohydrin in aqueous solution is used in the second crosslinking step, a repeated addition of the crosslinking agent can be done.

The products according to the invention are stable in water at a pH-value of 1-13 and can be dried and reswelled and sterilized in water in an autoclave without losing their separation properties. As to the rigidity of the products and the flow properties improved thereby, this will be evident from the Examples given below.

The same properties as those characterizing the ideal gel for gel chromatography are also desirable when the gel is to be used as a starting material for the preparation of ion exchangers and other matrices for chromatography and also for the preparation of gels to which biologically active substances are bound.

The invention will be exemplified with agarose products designed for gel filtration. The advantages of the products as starting materials in the preparation of products for the applications mentioned above are nevertheless obvious.

EXAMPLE 1

(a) 100 ml of agarose gel in bead form (particle size 5 to 25 μm) treated with sodium borohydride and having a concentration of 6 % by weight of agarose were transferred from water to acetone by repeated sedimentation in acetone and acetone was added to a total volume of 200 ml. 10 g of a 1:1-mixture of pentaerythritol triglycidyl ether and pentaerythritol tetraglycidyl ether and 1 ml of 45% sodium hydroxide were added and the suspension was stirred at room temperature over night. The mixture was refluxed for 8 h with stirring whereafter it was filtered and the gel was washed first with 300 ml of acetone and then three times with 300 ml of water each time.

(b) The gel of step (a) was transferred to dimethyl sulphoxide (DMSO) by a repeated washing procedure and the volume was adjusted to 100 ml. 40 g of epichlorohydrin and 0.5 g of sodium borohydride were added and the temperature was raised to 50° C. A mixture of 45% sodium hydroxide in an amount equivalent to the crosslinking agent was added drop-wise over 6 h and the reaction mixture was stirred over night. After cooling the product was transferred to water by a repeated sedimentation process and the total volume was adjusted to 100 ml. 45% sodium hydroxide in an excess of 10% when compared to the equimolar amount and 0.5 g of sodium borohydride were added and then 40 g of epichlorohydrin drop-wise over 6 h. The mixture was held at 50° C. over night during continued stirring, filtered and the gel was washed 4 times with 300 ml of water each time.

EXAMPLE 2

100 ml of agarose gel in bead form (40–80 μm, 6% by weight of agarose) treated with sodium borohydride were reacted analogous to Example 1 but with 40 g of epichlorohydrin in water in place of 40 g of epichlorohydrin in dimethyl sulphoxide and with exclusion of the last epichlorohydrin reaction in water.

EXAMPLE 3

(a) Analogous to Example 1 (a) 100 ml of agarose gel in bead form (40–80 μm, 6% by weight) treated with sodium borohydride were transferred to acetone and reacted with 10 g of 1,3-bis-glycidoxybutane.

(b) The obtained water-washed product was transferred to DMSO and reacted with 40 g of epichlorohydrin analogous to Example 1(b) but with exclusion of the last epichlorohydrin reaction in water.

EXAMPLE 4

(a) Analogous to Example 1 (a) 100 ml of agarose gel in bead form (5–15 μm, 6% by weight) treated with sodium borohydride were transferred to diglyme and reacted with 10 g of 1,4-bis-glycidoxy butane.

(b) The obtained, water-washed product was treated and reacted in the way mentioned in Example 2 (b).

EXAMPLE 5

(a) Analogous to Example 1 (a) 100 ml of agarose gel in bead form (5–25 μm, 12% by weight) were transferred to acetone and reacted with 10 g of a 1:1-mixture of pentaerythritol triglycidyl ether and pentaerythritol tetraglycidyl ether.

(b) The obtained water-washed product was transferred to 100 ml of acetone and reacted with 40 g of epichlorohydrin and an equivalent amount of 45 % sodium hydroxide. The reactants were, however, divided into eight portions and were added in pairs each hour. The reaction was then allowed to proceed for additional 2 h. After cooling the product was transferred to water and reacted with 40 g of epichlorohydrin analogous to the second epichlorohydrin reaction of Example 1 (b).

COMPARATIVE TEST

In order to test the rigidity of the gels according to the invention in a chromatographic system the gels of Examples 1, 2 and 3 were packed in chromatography columns having a diameter of 5 mm and a length of 250 to 300 mm. Pressure/flow-diagrams could be recorded by pumping water through the columns at increasing rates and simultaneously following the increase in pressure that was produced. As a comparison also a commercial agarose product was tested which product was prepared by crosslinking of agarose with 2,3-dibromopropanol according to British patent specification No. 1 352 613 (Sepharose®CL-6B from Pharmacia Fine Chemicals AB, Uppsala, Sweden).

It became evident that the commercial product exhibited a substantially linear pressure-flow dependency (indicating a useful working range) up to about 2 kg/cm$^2$ and a collapse at about 4 kg/cm$^2$ whereas the gel of Example 1 exhibited a substantially linear pressure-flow dependency up to about 25 kg/cm$^2$ and the gels of Examples 2 and 3 to about 10 kg/cm2.

We claim:

1. A chromatographic separation material of crosslinked agarose, wherein the agaros is crosslinked using (a) at least one bi-or poly-functional crosslinking agent which gives a chain of 6 to 12 atoms between two binding points and (b) at least one bifunctional crosslinking agent which gives a chain of 2 to 5-atoms between two binding points.

2. A chromatographic separation material as set forth in claim 1, wherein the crosslinked agarose is the product obtained by crosslinking agarose in two steps with at least one crosslinking agent (a) and with at least one crosslinking agent (b), the crosslinking step, which is carried out first, being carried out in an aprotic solvent.

3. A separation material as set forth in claim 1, wherein the pressure-flow dependency of the crosslinked agarose is linear up to 10 kg/cm$^2$.

4. A process for the preparation of a chromatographic separation material, which process comprises crosslinking agarose in two steps with (a) a bi- or polyfunctional crosslinking agent, which gives a chain of 6 to 12 carbon atoms between two binding points, and (b) a bifunctional crosslinking agent, which gives a chain of 2 to 5 atoms between two binding points, the first crosslinking step being carried out in an aprotic solvent.

5. A process as set forth in claim 4 wherein the last crosslinking step is divided up into two partial steps, the first partial step of which is carried out in an aprotic solvent and the second one in aqueous solution.

6. A process as set forth in claim 4, wherein the last crosslinking step is carried out in an aqueous solution.

* * * * *